May 5, 1959     O. R. ENGELMANN     2,884,702
OPTOMETRICAL DEVICE
Filed Sept. 9, 1954
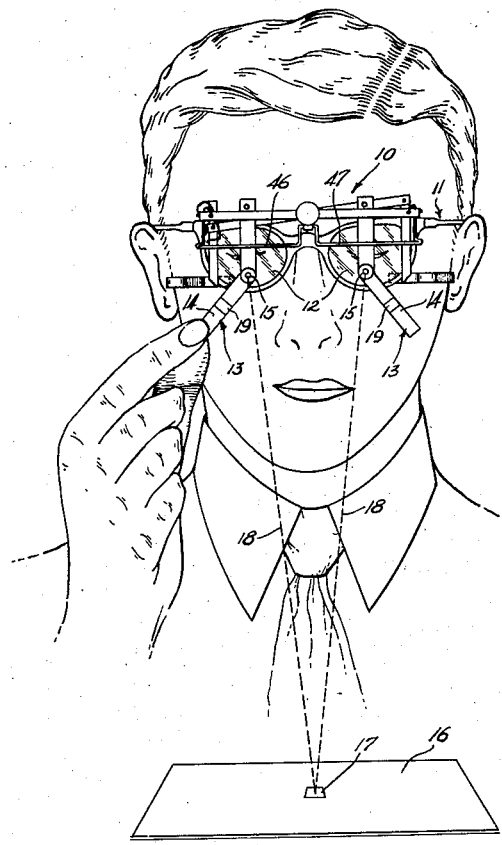
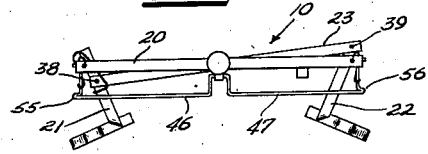
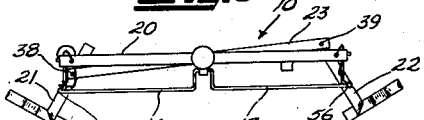
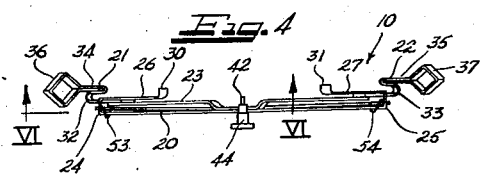
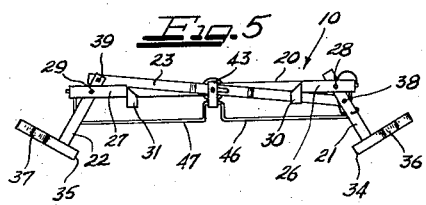
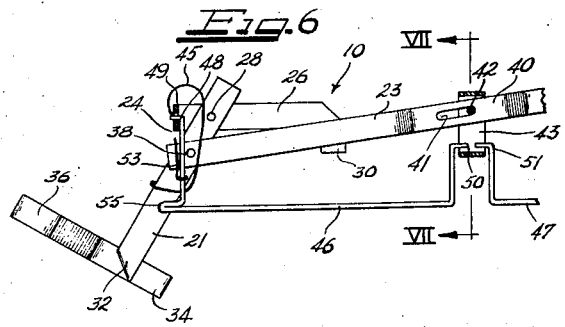
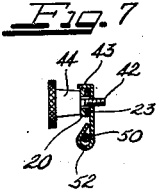
Inventor
OTTO R. ENGELMANN United States Patent Office 2,884,702
Patented May 5, 1959

2,884,702
OPTOMETRICAL DEVICE

Otto Reid Engelmann, Chicago, Ill.

Application September 9, 1954, Serial No. 454,935

6 Claims. (Cl. 33—200)

The present invention relates to an optometrical device, and more particularly relates to a device which permits and assists in more accurate optometrical measurement.

Still more particularly, the present invention relates to an optometrical device for more accurately measuring normal pupillary distances and torque or near torque pupillary axis distances and bifocal or other multifocal lens heights.

There is described in my co-pending parent application for patent entitled "Method and Means For Effecting Certain Measurements in the Fitting of Eyeglasses," U.S. Serial No. 348,454, filed April 13, 1953, of which this is a continuation-in-part, many of the heretofore known methods of measuring pupillary distances and pupillary axis distances, and the disadvantages attending the use of such heretofore known methods and devices. It is particularly pointed out, however, that the disadvantages attending those methods and devices, while being corrected by the invention described in my above identified parent application, as well as by the invention of the instant application, resulted in an improper fitting of eyeglasses or caused other errors with an accompanying ophthalmic discomfort.

The most common heretofore known method for measuring pupillary axis distances was to have the patient look straight ahead of him while the distance between his pupils was measured by a millimeter rule. Such measurement did not account for the change in the pupillary distance under the torque conditions nor did it permit fitting of the eyeglasses in accordance with the average between the near torque pupillary axis distance and the normal pupillary axis distance in the plane of the eyeglasses.

The devices embodying the principles of the present invention, however, take all of these considerations into account and effect the taking of proper measurements in substantially the same manner as that described in my co-pending application for patent. That is, the present invention utilizes the principles of the invention described in my parent application to permit proper measurements and averaging of pupillary distances under normal conditions as well as under torque conditions and further permits accurate measurement for proper fitting of bifocal or other multifocal ophthalmic correction lenses.

Therefore, an important object and feature of the present invention is to provide a new and improved optometrical device for measuring various ophthalmic distances.

Another important object and feature of the present invention is to provide a new and improved optometrical device for measuring such ophthalmic distances as normal pupillary axis distances, torque and near torque pupillary axis distances, and proper height for bifocal and other multifocal lenses.

Still another object and feature of the present invention is to provide a new and improved optometrical device operable to hold pupillary sighting members against ophthalmic lens frames and/or the lenses therein for taking proper ophthalmic measurements in order to properly set such ophthalmic devices as eyeglasses and the like.

Still another object and feature of the present invention is to provide a new and improved optometrical device wherein a pair of resiliently and pivotally mounted clamping bars are associated with an ophthalmic lens frame clamping frame structure to resiliently hold pupillary sighting members against the ophthalmic lens frame and/or the lenses therein.

Yet another object and feature of the present invention is to provide a new and improved optometrical device wherein a first frame bar carries a pair of frame clamping members pivotally connected thereto and further pivotally connected to a second frame bar whereby movement of the pair of clamping members is symmetrical with respect to the first frame bar to clamp an ophthalmic lens frame between the first frame bar and said pair of frame clamping members and further wherein a second pair of clamping bars are pivotally connected to said first frame bar to resiliently bear against lenses in said ophthalmic lens frame to resiliently hold pupillary sighting members thereagainst.

Still other objects, features and advantages of the present invention will become readily apparent to those skilled in the arts, and others, from the following detailed description of the principles of the present invention and an embodiment thereof, from the claims, and from the accompanying drawings in which each and every detail shown is fully and completely disclosed as a part of this specification, in which like reference numerals refer to like parts, and in which Figure 1 is an illustration of an optometrical device embodying the principles of the present invention showing the same gripping the ophthalmic lens frame of a person utilizing the device to measure his torque or near torque pupillary axis distance;

Figure 2 is a front elevational view of a device embodying the principles of the present invention and shown with the side edge clamping members resiliently arranged inwardly toward the center of the device;

Figure 3 is a front elevational view of the same device but with the side edge clamping members urged outwardly;

Figure 4 is a top plan view of the device as shown in Figure 3;

Figure 5 is a rear elevational view of the device as shown in Figure 3;

Figure 6 is a fragmental enlarged sectional view of the device shown as taken substantially along the lines VI—VI of Figure 4; and, Figure 7 is a sectional view of the clamping portion of the device shown as taken substantially along the line VII—VII of Figure 6.

As shown on the drawings:

As shown in Figure 1, an optometrical device 10 embodying the principles of the present invention is operative to fit onto and clamp onto an ophthalmic lens frame 11 which is worn by a patient and which carries therein a pair of ophthalmic correction lenses 12—12. The instrument 10 is further operative to clamp a pair of pupillary sighting members 13—13 against the lenses 12 in such a manner that the doctor or patient may adjust the pupillary sighting members for proper spacing and positioning thereof in order to determine the normal pupillary distance as well as the torque or near torque pupillary axis distance and the proper height and width for bifocal or other multifocal lenses.

For such purposes, as described in my parent application, the sighting members 13—13 are each preferably formed of a flat strip of transparent material and configurated with handles 14—14 for adjustment of the position of the members 13. Target apertures or colored regions 15—15, of complementary colors to the color of a sighting target 16 are provided on the sighting members for sighting therethrough by the patient to the target spot 17 on the target. If, for example, the target 16 is phosphorescent or nearly bright red, with the target spot 17 being green or black, and the sighting target colored regions 15—15 being green with central red spots, then sighting therethrough, in a proper manner, will show the target spot 17 as being black and surrounded by a red area which is encircled by a black area. When the sighting members 13—13 are properly adjusted in this manner with the target 16 being distantly spaced from the patient, then the pupillary distance may be measured. When the target 16 is placed at a substantially closer distance to the patient then the torque or near torque pupillary axis distance may be measured; the lines of pupillary axis being indicated generally by the dash lines 18, 18. As also described in my parent application, red areas 19—19 are provided on the sighting members 13—13 to be adjusted in their position for proper determination of the height and axis position for lens segments in bifocal or other multifocal ophthalmic correction lenses.

As stated hereinabove, the instrument 10 is operable to clamp onto the eyeglass frames 11. For this purpose, the instrument 10 is provided with a top cross frame bar 20 to which there are pivotally secured a pair of side edge clamping members 21 and 22. Also pivotally connected to the side edge clamping members 21 and 22 is a second, coordinating cross frame bar 23 which is set at an angle with respect to the first frame bar 20 so as to substantially intersect the same in the region of the center thereof. The pivotal connection of the several members is such that movement of the side edge clamping members 21 and 22 is symmetrical as coordinated by the bar 23 so that the ends thereof are equidistant from the center of the instrument 10 whether they are spaced inwardly as shown in Figure 2 or outwardly as shown in Figure 3 or at some intermediate point therebetween such as shown in Figure 1.

These frame elements such as the frame bars 20 and 23 as well as the edge clamping members 21 and 22 may be formed of any particular desired material but in a preferred construction are formed of such material as strips of sheet metal and the like so that they are sufficiently rigid to maintain the proper physical configurations therefor. The particular sheet metal strips 20, 21 and 22 are particularly configurated to clamp the eyeglass frames such as indicated in Figure 1. For this purpose, the frame bar 20 is provided with a pair of reversed folds or bends so that it is substantially bent back upon itself in the region of the extremities thereof as indicated generally as at 24 and 25 respectively. The reverse bent portions of the frame bar 20 are such that the rearward legs 26 and 27 respectively are spaced somewhat rearwardly of the full cross bar central portion of the frame bar 20 and it is these rearward legs 26 and 27 to which the side clamping members 21 and 22 are pivotally secured by rivets or the like 28 and 29.

At the extremities of the legs 26 and 27 they are bent downwardly as at 30 and 31 by oblique folds which space the extreme ends thereof rearwardly outwardly from the legs 26 and 27 as well as downwardly therefrom. These downwardly projecting portions 30 and 31 on the first frame bar 20 are thus so configurated and arranged as to clamp onto the upper portion of the ophthalmic lens frames in the region of the lenses therein or the lens apertures therein.

The side or edge clamping members 21 and 22 extend generally downwardly from the pivot points 28 and 29 for a substantial distance where they are bent or folded obliquely inwardly as at 32 and 33 respectively; these oblique inward bends also being spaced rearwardly from the main body or lever portion of the edge clamping members. With the provision of this spacing of the several oblique folds or bends in the parts described, the eyeglass frames may be clamped therein and therebetween with the principal parts of the instrument 10 being disposed in front of the frames and the lenses and with the oblique folded portion extending about the edge of the frames and the tops of the frames to the rearward side thereof to clamp the frames.

In addition to the oblique bends, the remainder of the side edge clamping members are reverse folded outwardly as at 34 and 35 to form handles 36 and 37 thereon for operating the same.

When manipulating the edge clamping members 21 and 22, the positions thereof will remain symmetrical with respect to the primary frame bar 20 since these members are also pivotally connected to the cross bar 23 which is secured thereto as by means of rivets or the like 38 and 39. This cross bar 23 is diagonally set with respect to the main frame bar 20 so that one end thereof is pivotally connected to the edge clamping member 21 below the rivet 28 while the other end thereof is connected to the edge clamping member 22 above the rivet 29. With this arrangement of the parts, when one or the other of the handle members 36 and 37 is manipulated to move the edge clamping members 21 and 22 inwardly or outwardly, both of the edge clamping members will move symmetrically and simultaneously by their connection with the cross bar 23.

The cross bar 23 thus is diagonally set with respect to the main frame bar 20 and by clamping the main frame bar 20 and the cross bar 23 together, securely, the edge clamping members 21 and 22 may be fixed in any desired position.

To this end, the cross bar 23 is offset generally toward the main frame bar 20 in the region of the central portion 40 where the cross bar 23 is slotted, as at 41, with a longitudinally extending slot. This slot 41 is operable to limit inward and outward movement of the edge clamping members 21 and 22 as well as to accept a screw 42 which extends therethrough and through an aperture in the center of the main frame bar 20 to threadably engage a clamping strip 43 in an appropriate threaded aperture therein. This clamping strip has the upper end thereof bent forwardly to overlie the upper edges of the cross bar 23 and the primary frame bar 20 so as to aid in retaining the several members in a properly disposed position when the screw 42 is loosened through proper manipulation of the thumb screw head 44 thereon at the forward end thereof.

Thus, the instrument 10 may be set on eyeglass frames such as the frames 11 and clamp the same by spreading the edge clamping members 21 and 22 outwardly, thence hooking the tabs 30 and 31 onto the upper edges of the frames and thence moving the members 21 and 22 inwardly so that the side edges of the frames are clamped in the oblique folds 32 and 33. Thereafter the screw clamp including the screw 42 and the clamping strip 43 may be tightened to clamp the frame bar 20 and the cross bar 23 together thus holding the instrument 10 clamped onto the lens frames 11. To additionally facilitate the clamping operation, the edge clamping members 21 and 22 may be biased inwardly by such means as a spring 45, which is shown as a strip spring or wire spring, and which is secured at one end to the edge clamping member 21 and at its other end to the main frame bar 20 in the region of the reverse fold 24 by extending through an appropriate aperture therein. This spring 45 will thus serve to resiliently urge the edge clamping members 21 and 22 inwardly towards a gripping relation with the eyeglass frames 11 thus facilitating an improved centering and clamping of the ophthalmic lens frame 11.

When the instrument 10 is so mounted on the ophthalmic lens frame 11, a pair of pupillary sighting member clamping bars 46 and 47, which are resiliently and hingedly carried on the instrument 10 as a part thereof will be operative to clamp the pupillary sighting members 13—13 against the lenses 12 or against the frames 11 over the lens apertures in the frame 11. These clamping bars 46 and 47 are mounted on the frame structure of the instrument 10 as by being generally U-shaped with the ends thereof turned outwardly from the bite of the U as shown in great detail in Figure 6. In Figure 6 it is shown that the outer end of the clamping bar 46, which clamping bar along with clamping bar 47 may be formed of any desired material such as a metal wire or the like, has its outer end 48 bent outwardly through an appropriate aperture 49 in the reverse fold 24. Since the clamping bars 46 and 47 are symmetrical, the outer end of the other clamping bar will also extend through an appropriate aperture in the reverse fold 25 of the main frame bar to be hingedly carried thereby. The inner ends 50 and 51 of the clamping bars 46 and 47 are bent inwardly towards the center of the instrument and are there hingedly carried by a loop bend 52 in the clamp strip 43 in the portion thereof which extends downwardly from the region of the threaded aperture accepting the screw 42.

To resiliently bias the pupillary sighting member clamping bars 46 and 47 towards the lenses 12 or the lens apertures in the frame 11, a pair of wire springs 53 and 54 are fixed to the main frame bar 20 at one end of each thereof and to the outer legs of the clamping bars 46 and 47 respectively.

To facilitate convenient manipulation of the clamping bars 46 and 47 they are provided with integral outwardly bent ears or lobes 55 and 56 respectively so that the clamping bars 46 and 47 may be held outwardly from the glasses for the placement of the pupillary sighting members 13—13 hereunder respectively.

From the foregoing it will be most readily observed that numerous variations and modifications may be made in devices embodying the principles of the present invention without departing from the true spirit and scope of the novel concepts thereof. I, therefore, intend to cover all such modifications and variations as fall within the true spirit and scope of the novel concepts and principles of my invention.

I claim as my invention:

1. A device for attachment to eyeglass frames to ascertain certain ophthalmic distances comprising a frame structure operable to clamp onto the eyeglass frames and including a main frame bar having eyeglass frame engaging tabs thereon and a pair of edge clamping members resiliently pivotally mounted on said main frame bar, and other resiliently mounted members pivotally secured to said frame structure to resiliently bear against lenses in the eyeglass frames and clamp pupillary sighting members against the eyeglass frames and the lenses therein and a second frame bar pivotally connected to said edge clamping members to maintain the same symmetrical with respect to said main frame bar.

2. A device for attachment to eyeglass frames to ascertain certain ophthalmic distances comprising a frame structure operable to clamp onto the eyeglass frames and including a main frame bar having eyeglass frame engaging tabs thereon and a pair of edge clamping members resiliently pivotally mounted on said main frame bar, and other resiliently mounted members pivotally secured to said frame structure to resiliently bear against lenses in the eyeglass frames and clamp pupillary sighting members against the eyeglass frames and the lenses therein and a second frame bar pivotally connected to said edge clamping members to maintain the same symmetrical with respect to said main frame bar, and screw clamp means to clamp said second frame bar to said first frame bar.

3. An ophthalmic distance measuring device comprising a first frame bar having a pair of reverse folds therein and downturned end portions to rest on the upper portion of an ophthalmic lens frame, a pair of clamping frame members pivotally secured to said first frame bar adjacent to the reverse folds therein and resiliently urged toward the center thereof, a second frame bar pivotally connected to said clamping frame members to maintain the same symmetrically disposed with respect to said first frame bar, screw clamping means to releasably clamp said second frame bar to said first frame bar in any adjusted position of said clamping frame members, said clamping frame members having bent portions near the free ends thereof to bear against the side edges of the ophthalmic lens frames and grip the same, and a pair of pupillary sighting member clamping bars pivotally secured to said first frame bar to bear against lenses in said ophthalmic lens frames.

4. An ophthalmic distance measuring device comprising a first frame bar having a pair of end portions to rest on the upper portion of an ophthalmic lens frame, a pair of clamping frame members pivotally secured to said first frame bar adjacent to the respective end portions and resiliently urged toward the center thereof, a second frame bar pivotally connected to said clamping frame members to maintain the same symmetrically disposed with respect to said first frame bar, screw clamping means centrally between the ends of said first frame bar to releasably clamp said second frame bar to said first frame bar in any adjusted position of said clamping frame members, said clamping frame members having portions near the free ends thereof to bear against the side edges of the ophthalmic lens frames and grip the same, and a pair of pupillary sighting member clamping bars pivotally secured to said first frame bar to bear against lenses in said ophthalmic lens frames, said screw clamping means including a clamping portion with a depending support for the adjacent ends of the pair of clamping bars.

5. In a device for attachment to eyeglass frames to measure certain ophthalmic distances, a frame structure having members pivotally mounted thereon and swingable generally in the plane of the eyeglass frames for engagement with the respective opposite outer sides of the eyeglass frames to clamp the device onto the eyeglass frames, means on the frame structure for engaging across the eyeglass frames for adjustably maintaining pupillary sighting members in position with respect thereto, and a coordinating bar pivotally connected to said pivotally mounted members to maintain the same symmetrical with respect to the frame structure in all positions of swinging movement of the members.

6. In a device for attachment to eyeglass frames to measure certain ophthalmic distances, a frame structure having members pivotally mounted thereon and swingable generally in the plane of the eyeglass frames for engagement with the respective opposite outer sides of the eyeglass frames to clamp the device onto the eyeglass frames, means on the frame structure for engaging across the eyeglass frames for adjustably maintaining pupillary sighting members in position with respect thereto, and a coordinating bar pivotally connected to said pivotally mounted members to maintain the same symmetrical with respect to the frame structure in all positions of swinging movement of the members, each of said members having a handle portion projecting substantially therefrom away from the adjacent portion of the frame structure and thus engageable manually beyond the respective outer sides of the eyeglass frames.

References Cited in the file of this patent

UNITED STATES PATENTS

| | | |
|---|---|---|
| 339,676 | Miles | Apr. 13, 1886 |
| 1,130,634 | Rooney | Mar. 2, 1915 |
| 1,263,713 | Smith | Apr. 23, 1918 |
| 1,557,322 | Peck | Oct. 13, 1925 |
| 1,596,810 | Cooney | Aug. 17, 1926 |
| 1,981,439 | Smith | Nov. 20, 1934 |
| 2,441,453 | Szabo | May 11, 1948 |
| 2,545,673 | Pozarik | Mar. 20, 1951 |
| 2,574,749 | Mendelsohn | Nov. 13, 1951 |
| 2,596,264 | Macbeth | May 13, 1952 |

FOREIGN PATENTS

| | | |
|---|---|---|
| 632,908 | Great Britain | Dec. 5, 1949 |